(12) United States Patent
Guenther et al.

(10) Patent No.: US 12,498,342 B2
(45) Date of Patent: Dec. 16, 2025

(54) METHOD FOR PREPARING A WORKING ELECTRODE

(71) Applicant: Roche Diabetes Care, Inc., Indianapolis, IN (US)

(72) Inventors: Arnfried Guenther, Hirschberg (DE); Alexander Steck, Hirschberg (DE)

( * ) Notice: Subject to any disclaimer, the term of this patent is extended or adjusted under 35 U.S.C. 154(b) by 296 days.

(21) Appl. No.: 18/034,216

(22) PCT Filed: Nov. 22, 2021

(86) PCT No.: PCT/EP2021/082391
§ 371 (c)(1),
(2) Date: Apr. 27, 2023

(87) PCT Pub. No.: WO2022/106668
PCT Pub. Date: May 27, 2022

(65) Prior Publication Data
US 2023/0384255 A1    Nov. 30, 2023

(30) Foreign Application Priority Data

Nov. 23, 2020    (EP) .................................. 20209218

(51) Int. Cl.
| | | |
|---|---|---|
| *G01N 27/327* | (2006.01) | |
| *A61B 5/1486* | (2006.01) | |
| *C12Q 1/00* | (2006.01) | |
| *C12Q 1/26* | (2006.01) | |

(52) U.S. Cl.
CPC ......... *G01N 27/3271* (2013.01); *C12Q 1/006* (2013.01); *C12Q 1/26* (2013.01); *A61B 5/1486* (2013.01); *G01N 2333/902* (2013.01)

(58) Field of Classification Search
None
See application file for complete search history.

(56) References Cited

U.S. PATENT DOCUMENTS

| | | |
|---|---|---|
| 4,506,015 A | 3/1985 | Ho et al. |
| 9,829,459 B2 | 11/2017 | Zhu et al. |
| 2002/0090738 A1 | 7/2002 | Cozzette et al. |
| 2006/0169599 A1 | 8/2006 | Feldman et al. |
| 2014/0166612 A1 | 6/2014 | Petisce et al. |
| 2018/0328877 A1 | 11/2018 | Vaddiraju et al. |

FOREIGN PATENT DOCUMENTS

| | | |
|---|---|---|
| CN | 111670006 | 9/2020 |
| TW | 201945546 | 12/2019 |
| WO | WO 2018/049170 | 3/2018 |

OTHER PUBLICATIONS

International Search Report and Written Opinion in related PCT/EP2021/082391 mailed Feb. 2, 2022.

*Primary Examiner* — J. Christopher Ball
(74) *Attorney, Agent, or Firm* — Woodard, Emhardt, Henry, Reeves & Wagner, LLP

(57) ABSTRACT

The present invention relates to a method for the preparation of a working electrode, the method comprising application of a sensing material in several steps. Further, the present invention relates to an analyte sensor comprising the working electrode as well as to the use of the analyte sensor for detecting at least one analyte in a sample.

23 Claims, 4 Drawing Sheets

METHOD FOR PREPARING A WORKING ELECTRODE

TECHNICAL FIELD

The present invention generally relates to a method for the preparation of a working electrode and to an analyte sensor comprising the working electrode as well as to the use of the analyte sensor for detecting at least one analyte in a sample. In particular, the invention relates to a method for the preparation of a working electrode, the method comprising application of a sensing material.

BACKGROUND ART

Monitoring certain body functions, more particularly monitoring one or more concentrations of certain analytes, plays an important role in the prevention and treatment of various diseases.

Along with so-called point measurements in which a sample of a body fluid is specifically taken from a user and investigated for the analyte concentration, continuous measurements are increasingly becoming available. Hence, there is an increasing demand for accurate analyte sensors that enable reliable and cost-efficient analyte detection from a body fluid or other samples. An analyte sensor for determining the concentration of an analyte under in vivo conditions is known from WO 2010/028708 A1. Another example of such sensor is disclosed in WO 2012/130841 A1. Moreover, WO 2007/147475 A1 discloses an amperometric sensor configured for implantation into a living body to measure the concentration of an analyte in a body fluid. An alternative sensor element is disclosed in WO 2014/001382 A1.

WO 2009/123624 A1 relates to a method of coating a medical device including obtaining an image of the device with the image being limited to an area fraction of the device. A coating is applied onto the area fraction by a print head comprising an array of nozzles wherein the print head is moved in a first linear path over the respective devices to eject drops of a coating material onto the first area fractions via the array of nozzles at a first set of firing points.

U.S. Pat. No. 9,309,550 B2 discloses a method of manufacturing a glucose sensor comprising a base layer, a conductive layer disposed upon the base layer, wherein the conductive layer includes a working electrode comprising a plurality of conductive nanotubes, an analyte sensing layer comprising glucose oxidase disposed on the conductive nanotubes and an analyte modulating layer disposed on the analyte sensing layer, wherein the analyte modulating layer modulates the diffusion of glucose therethrough. In this method, different layers of material may be applied to the conductive layer.

US 2018/0328877 A1 discloses analyte sensors and method for fabricating analyte sensors. In the method, an enzyme layer is applied to the planar flexible substrate.

US 2014/0166612 A1 discloses methods for fabricating analyte sensor components. The method comprises depositing layers onto a substrate.

US 2006/0169599 A1 describes a sensor utilizing a non-leachable or diffusible redox mediator and a method for manufacturing the sensor.

U.S. Pat. No. 9,829,459 B2 describes a method of depositing reagent on an electrochemical test sensor using a reagent-dispensing system.

Applying sensing material on a conductive layer on a working electrode of an analyte sensor is not trivial. The sensing material is hydrophilic, whereas the conductive layer, e.g. carbon, is hydrophobic. Thus, wetting of the substrate surface by the sensing material does practically not take place. As a result, the applied layer of sensing material may have after drying an increased edge thickness relative to the center region of the layer of the sensing material of several micrometers, resulting in a dry total thickness of about 5-10 µm at the edges of the sensing material layer. In case of a subsequent laser ablation, certain amounts of sensing material may remain at the edges, which may affect the sensor sensitivity. Increasing of the ablation depth is not possible without a risk of partially ablating the underlying layer of conductive material.

The problem to be solved by the present invention is to provide a method for the preparation of a working electrode that avoids the above-mentioned disadvantages. In particular, the present invention aims in providing a preparation method resulting in a sensing material structure having a substantially uniform thickness on the working electrode.

It is therefore desirable to provide methods for preparing a working electrode and an analyte sensor, which address the above-mentioned technical challenges. It is further desirable to provide a working electrode and an analyte sensor which have a high and reproducible sensitivity across charges but can be manufactured at low cost, e.g. by using a preparation process that produces a sensing material layer having a substantially uniform thickness.

SUMMARY

This problem is addressed by a method for the preparation of a working electrode and an analyte sensor comprising the working electrode, with the features of the independent claims. Advantageous embodiments, which might be realized in an isolated fashion or in any arbitrary combination, are listed in the dependent claims and throughout the specification.

The method according to the invention is advantageous as it allows the manufacturing of a working electrode, which may be comprised in an analyte sensor with a substantially uniform thickness and high and reproducible sensor sensitivity across charges. Further, the sensitivity can be selected and precisely adjusted during the manufacturing process. Since detailed monitoring and fine adaptation of manufacturing parameters can be avoided, costs may be reduced and factory calibration of the sensor is possible. Additionally, the sensor drift can be reduced. Furthermore, the stability of the sensing material during the manufacturing of the analyte sensor is increased. This means, that any degradation of the sensing material, in particular of the enzyme which is comprised in the sensing material, is reduced or even completely avoided during the manufacturing.

According to the present invention, a method for the preparation of a working electrode on a sensor substrate is disclosed. The working electrode may be part of an analyte sensor.

The method comprises the following steps, which specifically may be performed in the given order. Further, if not indicated otherwise, two or more process steps may be performed simultaneously or partially simultaneously. Further, one or more than one or even all of the method steps may be performed once or more than once or even repeatedly or continuously. The method may further comprise additional method steps, which are not listed specifically.

According to a first aspect of the invention, a method for manufacturing a working electrode of an analyte sensor is provided, wherein the method comprises the following steps:
- a) providing a substrate comprising
  - a first side and a second side,
  - at least one conductive material positioned on the first side of the substrate,
- b) applying a sensing material to an application area on the first side of the substrate, comprising
  - b1) applying a first layer of a sensing material at least partially onto the conductive material,
  - b2) applying a second layer of the sensing material at least partially onto the first layer of the sensing material, and
- c) obtaining the working electrode of the analyte sensor on the first side of the substrate, wherein the sensing material comprises
  - at least one enzyme and
  - at least one crosslinker, wherein the first layer of the sensing material is applied in step (b1) and the second layer of the sensing material is applied in step (b2) independently of one another in a wet layer thickness of at most about 70 µm.

In certain embodiments, the method further comprises step:
- b3) applying a third layer and optionally at least one further layer of the sensing material at least partially onto the second layer of the sensing material, wherein step (b3) is carried out after step (b2) and before step (c), wherein the third layer and the optional at least one further layer of sensing material is applied in step (b3) independently of one another in a wet layer thickness of at most about 70 µm.

In certain embodiments, the method further comprises:
drying a layer of the applied sensing material before applying the next layer of the sensing material.

In certain embodiments, step (c) of the method further comprises:
at least partially removing the applied sensing material from a first portion of the application area, e.g. by laser irradiation, wherein the sensing material is preserved on a second portion of the application area.

In certain embodiments, step (c) of the method further comprises:
curing the applied sensing material wherein at least a part of the sensing material is crosslinked.

In certain embodiments, step (c) of the method further comprises:
coating the sensing material with at least one further polymer layer.

A further aspect of the invention relates to a method for manufacturing an analyte sensor comprising manufacturing the working electrode as described above and providing at least one further electrode.

Still a further aspect of the invention relates to an analyte sensor comprising:
- (i) a substrate comprising
  - a first side and a second side, and
  - at least one conductive material positioned on the first side of the substrate, and
- (ii) a working electrode comprising a sensing material, which at least partially covers the first side of the substrate, wherein the sensing material is applied to an application area on the first side of the substrate, and optionally wherein the sensing material is at least partially removed from a first portion of the application area and is preserved on a second portion of the application area, and wherein the sensing material comprises
  - at least one enzyme and
  - at least one crosslinker, wherein the sensing material has a dry total thickness in the range from about 1 µm to about 10 µm, and wherein the dry total thickness of the sensing material is substantially uniform over the application area including the edges of the application area or optionally over the second preserved portion of the application area including the preserved edges of the application area.

Still a further aspect of the invention relates to an analyte sensor comprising:
- (i) a substrate comprising
  - a first side and a second side, and
  - at least one conductive material positioned on the first side of the substrate, and
- (ii) a working electrode comprising a sensing material, which at least partially covers the first side of the substrate, in particular the working electrode covers at least partially the conductive material, wherein the sensing material is applied to an application area on the first side of the substrate, in particular in a manner so that the sensing material is applied at least partially onto the conductive material, and optionally wherein the sensing material is at least partially removed from a first portion of the application area and is preserved on a second portion of the application area, and wherein the sensing material comprises
  - at least one enzyme and
  - at least one crosslinker, wherein the sensing material has a dry total thickness in the range from about 1 µm to about 10 µm, and wherein the dry total thickness of the sensing material is substantially uniform over the application area including the edges of the application area or optionally over the second preserved portion of the application area including the preserved edges of the application area.

In certain embodiments, the dry total thickness of the sensing material shows an increase of about 0.5 µm or less, more particularly of about 0.2 µm or less at the edges of the application area compared to the average dry total thickness of the sensing material over the application area or over the preserved portion of the application area.

Still a further aspect of the present invention relates to an analyte sensor comprising a working electrode as described above and at least one further electrode.

Definitions

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation, in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

DETAILED DESCRIPTION

The present invention relates to a method for manufacturing of a working electrode of an analyte sensor as described above and to a working electrode as described above.

The term "working electrode" as used herein, is a broad term and is to be given its ordinary and customary meaning to a person of ordinary skill in the art and is not to be limited to a special or customized meaning. The term specifically may refer, without limitation, to the electrode of the analyte sensor that is sensitive for the analyte. The working electrode may be disposed on the at least one first side of the at least one sensor substrate. In particular, the working electrode comprises at least one conductive material and at least one sensing material, wherein said at least one sensing material is applied to an application area on the conductive material on the first side of the sensor substrate in at least two separate steps, e.g. two or three or even more steps. In certain embodiments, the sensing material applied in each step is the same. Particularly, the layer is applied by cannula-coating.

The first layer of the sensing material, the second layer of the sensing material and, if present, a third layer and/or a further layer of the sensing material independently of another are applied in a wet layer thickness of at most about 70 µm, e.g. about 10 µm to about 70 µm, about m to about 60 µm or about 30 µm to about 40 µm. The wet layer thickness of a sensing material layer may be determined by the ratio of the flow rate of the sensing material from the cannula to the speed of the substrate relative to the cannula and the width of the layer according to the following formula:

$$T = FR/S/W,$$

wherein
T is the wet layer thickness in mm.
FR is the flow rate in ml/s
S is the speed of the substrate relative to the cannula in mm/s and
W is the width of the layer of the sensing material in mm.

The width of the layer of the sensing material may be determined by microscopy, preferably light scanning microscopy, in particular by laser scanning microscopy. Suitable light scanning microscopes are known and are, for example a Keyence microscope VK-9710 or a FRT MicroProf.

The wet layer thickness relates to the thickness of the sensing material before it is dried. For application of the sensing material in step b) the sensing material preferably comprises at least one solvent. A suitable solvent is for example selected from the group consisting of protic solvents, in particular water. The wet layer thickness relates to the thickness of the sensing material which comprises the at least one solvent, in particular water.

After application, the wet layers of sensing material are dried. Thus, the at least one solvent, in particular water, evaporates. In certain embodiments, each layer of sensing material is dried in an intermediate drying step before the next layer is applied. In certain embodiments, after drying, the first layer of the sensing material, the second layer of the sensing material and, if present, a third and/or a further layer of the sensing material independently of another have a dry layer thickness of at most about 10 µm, e.g. about 0.5 µm to about 5 µm or about 1 µm to about 2 µm or about 0.5 µm to about 1 µm. The dry layer thickness of a sensing material layer may be determined by light scanning microscopy, in particular by laser scanning microscopy. Suitable light scanning microscopes are known and are, for example a Keyence microscope VK-9710 or a FRT MicroProf.

In certain embodiments, after drying, the total sensing material, i.e. the combined sensing material applied in several layers onto the substrate has a dry total thickness in the range of about 1 µm to about 10 µm, preferably in the range of about 1 µm to 6 µm, particularly about 2 µm to about 5 µm or about 2 µm to about 4 µm. The dry total thickness of the sensing material may be determined by light scanning microscopy, in particular by laser scanning microscopy. Suitable light scanning microscopes are known and are, for example a Keyence microscope VK-9710 or a FRT MicroProf.

In the method of the invention, a sensing material is applied in at least two separate steps to an application area positioned on the first side of a substrate. After drying, the sensing material has a substantially uniform dry total thickness over the application area including the edges of the application area. The term "application area" as used herein, is a broad term and is to be given its ordinary and customary meaning to a person of ordinary skill in the art and is not to be limited to a special or customized meaning. The term specifically may refer, without limitation, to the whole area of the first side of the substrate where the sensing material has been applied. In certain embodiments, the application area is in the range of about 0.1 $mm^2$ to about 2 $mm^2$, particularly about 0.6 $mm^2$ In certain embodiments, the dry total thickness of the sensing material at the edges of the application area shows an increase of about 1 µm or less, more particularly of about 0.2 µm or less compared to the average dry total thickness of the sensing material over the application area. The average dry total thickness of the sensing material is determined by light scanning microscopy, in particular by laser scanning microscopy. Suitable light scanning microscopes are known and are, for example a Keyence microscope VK-9710 or a FRT MicroProf.

The working electrode of the present invention comprises a sensing material, which at least partially covers the first side of a substrate, in particular the at least one conductive material, wherein the sensing material has a dry total thickness in the range from about 1 µm to about 10 µm, preferably in the range of about 1 µm to 6 µm, preferably about 2 µm to about 5 µm or about 2 µm to about 4 µm, and wherein the dry total thickness of the sensing material is substantially uniform over the application area including the edges of the application area.

In certain embodiments, the sensing material is applied to the application area on the first side of the substrate and remains on the complete application area during the further steps for manufacturing. In further embodiments, the sensing material is at least partially removed from a first portion of the application area and is preserved on a second portion of the application area, i.e. the preserved portion during the further steps for manufacturing. In these embodiments, the sensing material has a dry total thickness in the range from about 1 µm to about 10 µm, preferably in the range of about 1 µm to 6 µm, preferably about 2 µm to about 5 µm or about 2 µm to about 4 µm, and wherein the dry total thickness of the sensing material is substantially uniform over the second preserved portion of the application area including the preserved edges of the application area. In this context, it should be noted that the term "edges" relates to the edges generated by the application of the sensing material on the application area.

The working electrode may be comprised in an analyte sensor. The analyte sensor typically comprises additionally a further electrode, such as for example a counter electrode and/or a reference electrode. The layer of sensing material may be present on the working electrode only and may typically be absent from any further electrodes, e.g. the counter electrode and/or the reference electrode may not comprise a layer of the sensing material.

In addition, the present invention discloses a method for manufacturing an analyte sensor. The method for manufacturing of an analyte sensor comprises the method for manufacturing a working electrode on a substrate as disclosed herein and a step of providing at least one further electrode.

The analyte sensor may be configured for at least partial implantation, specifically transcutaneous insertion, into a body tissue of a user; more specifically the analyte sensor may be configured for continuous monitoring of the analyte, even more specifically the analyte sensor may be configured for continuous glucose monitoring.

The terms "user" and "subject" are used interchangeably herein. The terms may in particular relate to a human being.

The term "analyte sensor" as used herein is a broad term and is to be given its ordinary and customary meaning to a person of ordinary skill in the art and is not to be limited to a special or customized meaning. The term specifically may refer, without limitation, to an arbitrary element or device configured for detecting or for measuring the concentration of the at least one analyte. The analyte sensor specifically may be an analyte sensor suitable for at least partial implantation into a body tissue of a user, more specifically an analyte sensor for continuous monitoring of the analyte.

In particular embodiments, the analyte sensor of the invention is an electrochemical sensor comprising the working electrode obtainable according to the method of the present invention and at least one further electrode and respective circuitry. More particularly, the sensor is an amperometric electrochemical sensor comprising the at least one working electrode. Typically, the analyte sensor comprises at least one further electrode, particularly a counter electrode and/or a reference electrode or a combined counter/reference electrode.

The working electrode is sensitive for the analyte to be measured at a polarization voltage which may be applied between working and reference electrodes and which may be regulated by a potentiostat. A measurement signal may be provided as an electric current between the counter electrode and the working electrode. A separate counter electrode may be absent and a pseudo reference electrode may be present, which may also work as a counter electrode. Thus, an analyte sensor typically may comprise a set of at least two, in an embodiment a set of three electrodes. Particularly, the sensing material is present in the working electrode only.

Particularly, the analyte sensor according to the present invention may be fully or a partially implantable and may, thus, be adapted for performing the detection of the analyte in the body fluid in a subcutaneous tissue, in particular, in an interstitial fluid. Other parts or components may remain outside of the body tissue. For example, as used herein, the terms "implantable" or "subcutaneous" refer to be fully or at least partly arranged within the body tissue of the user. For this purpose, the analyte sensor may comprise an insertable portion, wherein the term "insertable portion" may generally refer to a part or component of an element configured to be insertable into an arbitrary body tissue. The insertable portion comprises the working electrode and typically at least one further electrode, e.g. a counter, reference and/or counter/reference electrode. In certain embodiments, the working electrode is positioned on a first side of the substrate, the at least further electrode is positioned on the second side of the substrate and all electrodes are positioned on the insertable portion. The part of the sensor, which is not inserted, is the upper part of the sensor, which comprises the contacts to connect the sensor to the electronics unit.

Preferably, the insertable portion may fully or partially comprise a biocompatible surface, which may have as little detrimental effects on the user or the body tissue as possible, at least during typical durations of use. For this purpose, the insertable portion may be fully or partially covered with at least one biocompatibility membrane layer, such as at least one polymer membrane, for example a gel membrane which, on one hand, may be permeable for the body fluid or at least for the analyte as comprised therein, and may on the other hand be impermeable for compounds comprised in the analyte sensor, in particular in the working electrode, thus preventing a migration thereof into the body tissue. Further details regarding the biocompatibility membrane layer are disclosed elsewhere herein.

Further, the term "analyte" as used herein is a broad term and is to be given its ordinary and customary meaning to a person of ordinary skill in the art and is not to be limited to a special or customized meaning. The term specifically may refer, without limitation, to an arbitrary element, component or compound which may be present in a body fluid and the concentration of which may be of interest for a user. Specifically, the analyte may be or may comprise an arbitrary chemical substance or chemical compound, which may take part in the metabolism of the user, such as at least one metabolite. As an example, the at least one metabolite may be selected from the group consisting of glucose, cholesterol, triglycerides, lactate; more specifically the analyte may be glucose. Additionally or alternatively, however, other types of analytes and/or any combination of analytes may be determined.

Even further, the term "substrate" as used herein, is a broad term and is to be given its ordinary and customary meaning to a person of ordinary skill in the art and is not to be limited to a special or customized meaning. The term "substrate" is synonymously used with the term "sensor substrate" and specifically may refer, without limitation, to any kind of material or combination of materials, which is suitable to form a carrier layer to support the conductive material and/or the layer of sensing material as described herein. In particular, a "sensor substrate" as understood herein may comprise electrically insulating material.

The term "layer", as used herein, is a broad term and is to be given its ordinary and customary meaning to a person of ordinary skill in the art and is not to be limited to a special or customized meaning. The term specifically may refer, without limitation, to an element of a layer setup of the analyte sensor. Specifically, the term "layer" may refer to an arbitrary covering of an arbitrary substrate, specifically of a flat substrate. The layer may specifically have a lateral extension exceeding its thickness by at least a factor of 2, at least a factor of 5, at least a factor of 10, or even at least a factor of 20 or more. Specifically, the analyte sensor may have a layer setup. The analyte sensor may comprise a plurality of layers such as the at least one conductive material, the at least one layer of the at least one sensing material, and optionally at least one membrane layer. One or more of the layers of the analyte sensor may comprise sub-layers. For example, a layer comprising the conductive material may comprise at least one further layer.

The term "electrically insulating material", as used herein, is a broad term and is to be given its ordinary and customary meaning to a person of ordinary skill in the art and is not to be limited to a special or customized meaning. "Electrically insulating material" may also refer to a dielectric material. The term specifically may refer, without limitation, to a material or combination of materials which prevent the transfer of electrical charges and which do not sustain a significant electrical current. Specifically, without limiting other possibilities, the at least one electrically insulating material may be or may comprise at least one insulating resin, such as insulating epoxy resins used in manufacturing electronic printed circuit boards; in particular it may comprise or be a thermoplastic material such as polycarbonate, polyester like polyethylene terephthalate (PET), polyvinyl chloride (PVC), polyurethane, polyether, polyamide, polyimide or a copolymer thereof, such as glycol modified polyethylene terephthalate, polyethylene naphthalate, polytetrafluoroethylene (PTFE) or alumina.

In the method and in the analyte sensor according to the present invention, the sensor substrate may comprise two opposing sides, at least a first side and at least a second side opposing the first side.

Specifically, the analyte sensor, more specifically the sensor substrate, may additionally comprise at least one further electrode, wherein the at least one further electrode may comprise at least one of a reference electrode and a counter electrode. In an embodiment, the at least one further electrode comprises a combined counter/reference electrode. In particular, the reference electrode may comprise at least one reference electrode conductive material; and/or the counter electrode may comprise at least one counter electrode conductive material. More specifically, the at least one further electrode may be disposed on at least one of: the first side and the second side opposing the first side of the sensor substrate.

The term "conductive material", as used herein, is a broad term and is to be given its ordinary and customary meaning to a person of ordinary skill in the art and is not to be limited to a special or customized meaning. The term specifically may refer, without limitation, to an conductive strip, layer, wire or other type of elongated electrical conductor. More specifically, the term "conductive material" may refer, without limitation, to a material, which is conductive and hence capable of sustaining an electrical current, for example the conductive material may comprise at least one material selected from the group consisting of: carbon; carbon paste; gold; copper; silver; nickel; platinum; palladium. Specifically, the conductive material may be or may comprise at least one metal, such as one or more of gold, copper, silver, nickel, palladium or platinum. Additionally or alternatively, the at least one conductive material may be or may comprise at least one conductive compound, such as at least one conductive organic or inorganic compound. Additionally or alternatively, the at least one conductive material may be or may comprise at least one nonmetallic conductive material, e.g. polyaniline, poly-3,4-ethylenedioxythiophene (PEDOT), carbon or carbon paste. Carbon paste specifically may relate to a material comprising carbon, a solvent such as diethylene glycol butyl ether, and at least a binder such as vinyl chloride co- and terpolymers. Preferably, the conductive material according to the present invention may comprise gold and/or carbon; more preferably, the conductive material may consist of gold and/or carbon and/or carbon paste. Specifically the conductive material may comprise gold and a further material, for example carbon.

Moreover, the conductive material may comprise at least one further layer of at least one further material; specifically the further layer may comprise a further conductive material. More specifically the further layer of the conductive material may comprise or may consist of carbon. The further material may be disposed on the first side. Using a further layer, in particular carbon, may contribute to efficient electron transfer by the conductive material.

The conductive material may have a thickness of at least about 0.1 µm, preferably of at least about 0.5 µm, more preferably of at least about 5 µm, specifically of at least about 7 µm, or at least about 10 µm. In the case where the conductive material comprises carbon or is carbon, the conductive material may specifically have a thickness of at least about 7 µm, more specifically of at least about 10 µm, for example about 10 µm to 15 µm. Specifically, in the case where the conductive material is gold, the conductive material may have a thickness of at least about 100 nm, more specifically of at least about 500 nm.

A minimum thickness as specified above may be advantageous as it ensures proper electron transport. A thickness below the specified values is usually not sufficient for reliable electron transport. Even more specifically, the thickness should not exceed a value of about 30 µm in the case of carbon and a value of about 5 µm in the case of gold. If the thickness is too large, the overall thickness and hence the size of the analyte sensor may increase. Larger analyte sensor sizes are generally unwanted as they may cause difficulties when being implanted. Further, they may be less flexible, in particular in the case of carbon and/or they may be expensive, in particular in the case of gold.

The conductive material may be hydrophobic. For example, the contact angle of the conductive material with water may in the range from 60° to 140°, in particular about 100°, determined via microscopy, for example using a Keyence VHX-100, with a water droplet volume of 5 µl.

The conductive material may further comprise a rough surface. A rough surface usually increases the efficiency of electron transfer. Further, it increases the hydrophobicity. A rough surface means that the surface may comprise unevenness. The depth of this unevenness may for example be in the range from 1 µm to 15 µm, preferably in the range from 1 µm to 6 µm, such as about 3 µm, determined via light scanning microscopy, in particular via laser scanning microscopy. The distance between two rises in the rough surface may for example be in the range from 20 µm to 80

μm, such as about 40 μm, determined via light scanning microscopy, in particular via laser scanning microscopy.

The terms "reference electrode conductive material" and "counter electrode conductive material", as used herein, are broad terms and are to be given its ordinary and customary meaning to a person of ordinary skill in the art and are not to be limited to a special or customized meaning. The terms specifically may refer, without limitation, to a conductive strip, layer, wire or other type of elongated electrical conductor present on a reference electrode or a counter electrode, respectively. More specifically, the terms may refer, without limitation, to a material, which is conductive, and hence capable of sustaining an electrical current, for example the reference electrode conductive material and/or the counter electrode conductive material may comprise at least one material as specified herein above with respect to the conductive material. In addition to the materials listed above, the reference electrode conductive material and/or the counter electrode conductive material may specifically comprise Ag/AgCl.

The term "sensing material", as used herein, is a broad term and is to be given its ordinary and customary meaning to a person of ordinary skill in the art and is not to be limited to a special or customized meaning.

The sensing material comprises at least one enzyme; specifically the enzyme is capable of catalyzing a chemical reaction consuming at least the analyte; specifically the enzyme may be an $H_2O_2$ generating and/or consuming enzyme; even more specifically a glucose oxidase (EC 1.1.3.4), a hexose oxidase (EC 1.1.3.5), an (S)-2-hydroxy acid oxidase (EC 1.1.3.15), a cholesterol oxidase (EC 1.1.3.6), a glucose dehydrogenase (EC 1.1.1.47), a galactose oxidase (EC 1.1.3.9), an alcohol oxidase (EC 1.1.3.13), an L-glutamate oxidase (EC 1.4.3.11) or an L-aspartate oxidase (EC 1.4.3.16); even more specifically a glucose oxidase (GOx) including any modification thereof.

Moreover, the sensing material comprises at least one crosslinker; the crosslinker may for example be capable of crosslinking at least part of the sensing material. Specifically the sensing material may comprise at least one crosslinker selected from UV-curable crosslinkers and chemical crosslinkers; more specifically the sensing material comprises a chemical crosslinker.

The term "chemical crosslinker" as used herein, is a broad term and is to be given its ordinary and customary meaning to a person of ordinary skill in the art and is not to be limited to a special or customized meaning. The term specifically may refer, without limitation, to a crosslinker that is capable of initiating a chemical reaction generating a crosslinked molecular network and/or a crosslinked polymer when exposed to heat. "Exposed to heat" may refer to being exposed to a temperature above 15° C., specifically to a temperature above 20° C.; more specifically to a temperature in the range from 20° C. to 50° C. and even more specifically to a temperature in the range from 20° C. to 25° C. More specifically, chemical crosslinkers may initiate crosslinking of the layer of the sensing material when exposed to heat.

Suitable chemical crosslinkers according to the present invention are selected from: epoxide based crosslinkers, such as diglycidyl ethers like poly(ethylene glycol) diglycidyl ether (PEG-DGE) and poly(propylene glycol) diglycidyl ether; trifunctional short chain epoxides; anhydrides; diglycidyl ethers such as resorcinol diglycidyl ether, bisphenol, e.g. bisphenol A diglycidyl ether, diglycidyl 1,2-cyclohexanedicarboxylate, poly(ethylene glycol) diglycidyl ether, glycerol diglycidyl ether, 1,4-butanediol diglycidyl ether, poly(propylene glycol) diglycidyl ether, poly(dimethylsiloxane), diglycidyl ether, neopentyl glycol diglycidyl ether, 1,2,7,8-diepoxyoctane, 1,3-glycidoxypropyl-1,1,3,3-tetramethyldisioxane; triglycidyl ethers such as N,N-diglycidyl-4-glycidyloxyaniline, trimethylolpropane triglycidyl ether; tetraglycidyl ethers such as tetrakisepoxy cyclosiloxane, pentaerythritol tetraglycidyl ether, tetraglycidyl-4,4'-methylenebisbenzenamine.

In certain embodiments, the chemical crosslinker is PEG-DGE having a number average molecular weight of about 200 Da or more, e.g. a number average molecular weight of about 500 Da.

The term "UV-curable" as used herein, is a broad term and is to be given its ordinary and customary meaning to a person of ordinary skill in the art and is not to be limited to a special or customized meaning. The term specifically may refer, without limitation, to the ability of a chemical substance, for example, a crosslinker, of initiating a photochemical reaction generating a crosslinked molecular network and/or a crosslinked polymer when irradiated by light in the UV spectral range. More specifically, UV-curable crosslinkers may initiate crosslinking of the layer of the sensing material when irradiated by UV light. Crosslinking may in particular be initiated as indicated herein below.

Suitable UV curable crosslinkers according to the present invention include benzophenone, diazirine and azide. Particularly suitable UV-curable crosslinkers are for example selected from the group consisting of, benzophenone comprising crosslinkers, poly(di(2-hydroxy-3-aminobenzo-phenonepropylene) glycol), dibenzophenone 1,2-cyclohexanedicarboxylate, bis[2-(4-azidosalicylamido)ethyl] disulfide, reaction products of the reaction of 4-aminobenzophenone with any one of the above for the chemical crosslinker described diglycidyl crosslinkers, triglycidyl crosslinkers and tetraglycidyl crosslinkers, an example of such a reaction product is 2,4,6,8-tetramethyl-2,4,6,8-tetrakis(2-hydroxy-3-aminpropylbenzophenone)-cyclotetrasiloxane, and reaction products of the reaction of 4-benzoylbenzoic acid N-succinimidyl ester with a diamine or a jeffamine.

Further, the sensing material may comprise at least one polymeric transition metal complex. The term "polymeric transition metal complex" specifically may refer, without limitation, to a material that may be or may comprise at least a polymeric material; specifically it may be or may comprise at least a polymeric material and at least a metal containing complex. The metal containing complex may be selected from the group of transition metal element complexes, specifically the metal containing complex may be selected from osmium-complexes, ruthenium-complexes, vanadium-complexes, cobalt-complexes, and iron-complexes, such as ferrocenes, such as 2-aminoethylferrocene. Even more specifically, the sensing material may comprise a polymeric transition metal complex as described for example in WO 01/36660 A2, the content of which is included by reference. In particular, the sensing material may comprise a modified poly (vinylpyridine) backbone loaded with poly(biimidizyl) Os complexes covalently coupled through a bidentate linkage. A suitable sensing material is further described in Feldmann et al, Diabetes Technology & Therapeutics, 5 (5), 2003, 769-779, the content of which is included by reference. Suitable sensing materials further may include ferrocene-containing polyacrylamide-based viologen-modified redox polymer, pyrrole-2,2'-azino-bis(3-ethylbenzthiazoline-6-sulfonic acid) (ABTS)-pyrene, naphthoquinone-LPEI. The polymeric transition metal complex may represent a redox mediator incorporated into a cross-linked redox polymer network. This is advantageous as it may facilitate electron transfer between the at least one enzyme or analyte and the conductive material. In order to avoid a sensor drift, the redox mediator and the enzyme may be covalently incorporated into a polymeric structure.

In certain embodiments, the at least one enzyme comprised in the sensing material comprises an enzyme capable of catalyzing a chemical reaction consuming at least the analyte, particularly an $H_2O_2$ generating and/or consuming enzyme, a crosslinker and a polymeric transition metal complex. Specifically, the sensing material may comprise at least a polymeric transition metal complex and GOx and a chemical crosslinker. More specifically, the sensing material may comprise a modified poly(vinylpyridine) backbone loaded with poly(bi-imidizyl) Os complexes covalently coupled through a bidentate linkage, GOx and a chemical crosslinker like poly(ethylene glycol) diglycidylether (PEG-DGE). Suitable further sensing materials are known to the person skilled in the art.

In an embodiment, the sensing material may comprise a polymeric material and $MnO_2$-particles.

The sensing material according to the present invention may for example comprise about 40-60 wt % of a polymeric transition metal complex; about 30-40 wt % of an enzyme capable of catalyzing a chemical reaction consuming at least the analyte, particularly a $H_2O_2$ generating and/or consuming enzyme, and about 0.5-25 wt % of a crosslinker based on the dry total weight of the sensing material. When the sensing material is applied in step b) it may comprise at least one solvent, in particular water. Furthermore, it may comprise the polymeric transition metal complex, the enzyme and the crosslinker. The total concentration of the polymeric transition metal complex, the enzyme and the crosslinker in the at least one solvent, in particular in water, is for example in the range from 10 mg/ml to 200 mg/ml, in particular about 200 mg/ml.

The sensing material which is applied in step b) may have a viscosity in the range from 10 to 1000 mPas, preferably in the range from 80 to 120 mPas, for example about 100 mPas.

The method according to the invention may, additionally comprise at least one curing step wherein in the curing step at least a part of the sensing material is crosslinked. The terms "crosslinking" and "curing" are interchangeably used herein. Specifically, the curing step may take place after application and before drying. Further, the curing step may take place before the optional laser irradiation or alternatively, at least partially after performing laser irradiation.

Suitable ways for initiating crosslinking depend on the type of crosslinker and are known by the person skilled in the art. As the preferred crosslinker is a chemical crosslinker, the curing is preferably carried out essentially at room temperature or up to about 90° C., without UV light. Curing using UV-curable crosslinkers is generally induced by irradiation using UV light. As used herein, the term "UV light" generally refers to electromagnetic radiation in the ultraviolet spectral range. The term "ultraviolet spectral range" generally refers to electromagnetic radiation in the range of 1 nm to 380 nm, preferably light in the range of 100 nm to 380 nm.

The applying of the sensing material according to the present invention is performed in at least two steps, e.g. two or three steps, wherein in each step a layer of a sensing material is applied using at least one coating process.

As further used herein, the term "coating process" may refer to an arbitrary process for applying at least one layer to at least one surface of an arbitrary object. The applied layer may cover the object, for example the conductive material and/or the sensor substrate completely or may only cover a part or parts of the object. The layer may be applied via a coating process wherein a material is provided, e.g. in a liquid form, exemplarily as a suspension or as a solution, and may be distributed on the surface. Specifically, the coating process may comprise a wet-coating process selected from the group consisting of: spin-coating; spray-coating; doctor-blading; printing; dispensing; slot-coating; dip-coating; and cannula-coating.

In particular embodiments, at least one of the steps (b1), (b2) and, if present, (b3) for applying the sensing material is carried out via cannula-coating. In particular embodiments, all coating steps are carried out via cannula-coating. Steps (b1), (b2) and (b3) are also commonly referred to as coating steps within the context of the present invention. In certain embodiments, the cannula used in the coating process may be a metal cannula or a polymer cannula, e.g. PTFE cannula or a steel cannula. In certain embodiments, the cannula has an inner diameter of at least about 1 mm to about 2 mm, e.g. about 1.5 mm to about 1.7 mm. In certain embodiments, the cannula has an outer diameter in the range from 1.3 mm to about 2.3 mm, e.g. about 1.8 mm to about 2 mm. It is clear to the skilled person that the inner diameter of the cannula is smaller than the outer diameter of the cannula.

In certain embodiments, the speed of the substrate relative to the cannula during at least one of the steps (b1), (b2) and, if present, (b3), is in the range of about 1 mm/s to about 60 mm/s, particularly in the range of about 1 mm/s to about 20 mm/s, e.g. about 8 mm/s. In particular embodiments, the above indicated speed of the substrate relative to the cannula is used during all of the coating steps.

In certain embodiments, the flow rate of the sensing material from the cannula during at least one of the steps (b1), (b2) and, if present, (b3), is in the range of about 0.01 ml/min to about 0.09 ml/min, preferably in the range of about 0.02 ml/min to about 0.04 ml/min, particularly of about 0.03 ml/min. In particular embodiments, the above indicated flow rate of the sensing material is used in all of the coating steps.

In certain embodiments, the distance between the cannula and the surface of the first side of the substrate to which the sensing material is applied (i.e. the at least one conductive material in step (b1) and the previous layer of sensing material in step (b2), and, if present, (b3)), is in the range from about 30 μm to about 100 μm, particularly about 60 μm. In particular embodiments, the above indicated distance between the cannula and the surface to be coated is used during all of the coating steps.

In certain embodiments, the ratio of the flow rate of the sensing material from the cannula during at least one of the steps (b1), (b2) and, if present, (b3) to the speed of the substrate relative to the cannula during at least one of the steps (b1), (b2) and, if present, (b3), is in the range from about 0.02 mm² to about 0.19 mm² (square millimeters). In particular embodiments, the ratio of the flow rate of the sensing material from the cannula to the speed of the substrate relative to the cannula during all of the coating steps is in the above indicated range.

In certain embodiments, the ratio of the flow rate of the sensing material from the cannula during at least one of the steps (b1), (b2) and, if present, (b3) to the inner diameter of the cannula is in the range from about 0.11 mm²/s to about 0.97 mm²/s (square millimeters per second). In particular embodiments, the ratio of the flow rate of the sensing material from the cannula to the inner diameter of the cannula during all of the coating steps is in the above indicated range.

In certain embodiments, the ratio of the flow rate of the sensing material from the cannula during at least one of the steps (b1), (b2) and, if present, (b3) to the outer diameter of the cannula is in the range from about 0.09 mm²/s to about 0.82 mm²/s (square millimeters per second). In particular embodiments, the ratio of the flow rate of the sensing material from the cannula to the outer diameter of the cannula during all of the coating steps is in the above indicated range.

In certain embodiments, the ratio of the flow rate of the sensing material from the cannula during at least one of the steps (b1), (b2) and, if present, (b3) to the speed of the substrate relative to the cannula during at least one of the steps (b1), (b2) and, if present, (b3), to the inner diameter of the cannula is in the range from about 0.01 mm to about 0.12 mm. In particular embodiments, the ratio of the flow rate of the sensing material from the cannula to the speed of the substrate relative to the cannula to the inner diameter of the cannula during all of the coating steps is in the above indicated range.

In certain embodiments, the ratio of the flow rate of the sensing material from the cannula during at least one of the steps (b1), (b2) and, if present, (b3) to the speed of the substrate relative to the cannula during at least one of the steps (b1), (b2) and, if present, (b3), to the outer diameter of the cannula is in the range from about 0.01 mm to about 0.10 mm. In particular embodiments, the ratio of the flow rate of the sensing material from the cannula to the speed of the substrate relative to the cannula to the outer diameter of the cannula during all of the coating steps is in the above indicated range.

In certain embodiments, the ratio of the wet film thickness to the distance between the cannula and the surface to be coated (i.e. the at least one conductive material in step (b1) and the previous layer of sensing material in step (b2), and, if present, (b3)), is in the range from about 0.7 to about 3. In particular embodiments, the ratio of the wet film thickness to the distance between the cannula and the surface to be coated during all of the coating steps is in the above indicated range.

In step (c) of the method of the invention a working electrode of the analyte sensor is obtained on the first side of the substrate, The term "to obtain at least one working electrode", as used herein, is a broad term and is to be given its ordinary and customary meaning to a person of ordinary skill in the art and is not to be limited to a special or customized meaning. The term specifically may refer, without limitation, to forming and/or manufacturing the working electrode.

Step (c) may further comprise a partial removal of applied sensing material, e.g. by irradiating the sensing material with at least one laser beam, wherein at least the first portion of the applied sensing material is at least partially removed and wherein at least the second portion of the sensing material covering the at least one conductive material is preserved on the first side of the sensor substrate to obtain at least one working electrode of the analyte sensor.

The method according to the present invention may further comprise an additional step of drying the at least one of the applied layers of the at least one sensing material before applying the next layer. The drying step may take place at ambient temperature. Specifically, the sensing material may be dried at ambient temperature for about 10 minutes or less, or about 5 minutes or less, e.g. about 0.5 to about 10 minutes. The term "ambient temperature" as used herein is understood as a temperature specifically between 15° C. and 30° C., more specifically between 20° C. and 25° C.

The method according to the present invention may further comprise an additional step of applying at least one membrane layer, the membrane layer at least partially covering the working electrode. The membrane layer generally may selectively allow for one or more molecules and/or compounds to pass, whereas other molecules and/or compounds are stopped by the membrane layer. Thus, the membrane layer is permeable for the at least one analyte to be detected. Thus, as an example, the membrane layer may be permeable for one or more of glucose, lactate, cholesterol or other types of analytes. The at least one membrane layer may hence function as a diffusion barrier that controls diffusion of the analyte from the exterior, e.g. the body fluid surrounding the analyte sensor, to the sensing material, i. e. the enzyme molecules in the sensing material. In addition, the at least one membrane layer may function as a biocompatibility membrane layer as mentioned elsewhere herein.

The membrane layer, as an example, may have a thickness sufficient for providing mechanical stability. The at least one membrane layer specifically may have a thickness of about 1 μm to about 150 μm. For the at least one membrane layer, as outlined herein, several materials may be used, standalone or in combination. Thus, as an example, the membrane layer specifically may comprise one or more of a polymeric material, specifically a polyvinyl pyridine based copolymer, a polyurethane; a hydrogel; a polyacrylate; a methacrylate-acrylate copolymer or block-copolymer; among which polyvinyl pyridine based copolymers are particularly suitable. These types of membranes are generally known in the art. Moreover, the membrane layer may comprise a crosslinker, specifically a chemical crosslinker or a UV-curable crosslinker, e.g. as described above.

In step (c) of the method according to the invention, in addition to the at least one membrane layer, at least a second membrane layer may be applied. Said second membrane layer may be a biocompatibility membrane layer.

The biocompatibility layer may have a thickness of from about 1 μm to about 10 μm, in an embodiment of from about 3 μm to about 6 μm. More specifically, the biocompatibility layer covers the analyte sensor at least partly or completely. Even more specifically, the biocompatibility layer may be the outmost layer of the analyte sensor. The biocompatibility membrane layer may be or may comprise the following materials: methacrylate based polymers and copolymers, acrylamide-methacrylate based copolymers, biodegradable polysaccharides such as hyaluronic acid (HA), agarose, dextran, chitosan and a poly(vinylpyridine) based polymer.

The at least one membrane layer and/or the biocompatibility membrane layer may be applied by techniques known to those skilled in the art, using at least one coating process, specifically a wet-coating process, selected from the group consisting of: e. g. spin-coating; spray-coating; doctor-blading; printing; dispensing; slot-coating; dip-coating. A preferred wet-coating process is dip-coating or spray-coating.

The method according to the invention may further comprise at least one diffusion step wherein, in the diffusion step the crosslinker comprised in the membrane layer may at least partially diffuse into the sensing material. Diffusion may occur during applying the membrane layer to the sensing material. The diffusion of the crosslinker into the sensing material may allow for at least partial crosslinking of the sensing material independent of the amount of crosslinker in the sensing material during step (b1), step (b2), and, if present step (b3), of applying the sensing material to the substrate.

In the method according to the invention, the diffusion step may further comprise a swelling of at least a part of the sensing material. The term "swelling" as used herein is a broad term and is to be given its ordinary and customary meaning to a person of ordinary skill in the art and is not to be limited to a special or customized meaning. The term specifically may refer, without limitation, to the binding of water and/or to the binding of water-soluble solvent such as ethanol, methanol, acetone to a material, specifically to the binding of water and/or of water-soluble solvent to the sensing material. Due to the uptake of water and/or the uptake of water-soluble solvent into the sensing material, diffusion of the crosslinker into the sensing material may advantageously be enabled which may be required for efficient crosslinking. Swelling may moreover refer to the uptake of water from the membrane layer.

To allow for sufficient swelling in the method according to the present invention, the polymeric material in the sensing material may be capable of taking up of at least 10 wt.-% of water and/or solvent from the membrane layer based on the dry weight of the polymeric material within a time frame of several minutes, e.g. 1 to 15 minutes, more specifically at least 20 wt.-%, even more specifically at least 30 wt.-%, even more specifically up to 90 wt.-%.

This swelling and/or uptake of water and/or solvent is advantageous as diffusing of the crosslinker from the membrane layer into the sensing material may thereby be enabled.

Further, the present invention relates to an analyte sensor comprising at least one working electrode as described above.

The analyte sensor as described herein may in particular be obtainable by the method according to the invention for the preparation of a working electrode on a sensor substrate and a step of providing at least one further electrode, e.g. a counter electrode or a reference electrode or a combined counter/reference electrode.

Moreover, the present invention relates to the use of the analyte sensor for detecting at least one analyte in a sample; specifically in a sample of a body fluid. More particularly, the analyte sensor is a sensor for continuous glucose measurement.

As used herein, the term "body fluid" relates to all bodily fluids of a subject known to comprise or suspected to comprise the analyte of the present invention, including interstitial fluid, blood, plasma, lacrimal fluid, urine, lymph, cerebrospinal fluid, bile, stool, sweat, and saliva. Generally, an arbitrary type of body fluid may be used. Preferably, the body fluid is a bodily fluid which is present in a body tissue of a user, such as in the interstitial tissue. Thus, as an example, the body fluid may be selected from the group consisting of blood and interstitial fluid. However, additionally or alternatively, one or more other types of body fluids may be used. The body fluid generally may be contained in a body tissue. Thus, generally, the detection of the at least one analyte in the body fluid may preferably be determined in vivo.

The term "sample" is understood by the skilled person and relates to any sub-portion of a bodily fluid. Samples can be obtained by well-known techniques including, e.g., venous or arterial puncture, epidermal puncture, and the like.

The term "subject" as used herein is a broad term and is to be given its ordinary and customary meaning to a person of ordinary skill in the art and is not to be limited to a special or customized meaning. The term specifically may refer, without limitation, to a human being or an animal, independent from the fact that the human being or animal, respectively, may be in a healthy condition or may suffer from one or more diseases. As an example, the subject may be a human being or an animal suffering from diabetes. However, additionally or alternatively, the invention may be applied to other types of subjects.

Moreover, the present invention relates to a method for measuring an analyte in a sample comprising the analyte sensor described herein above.

The methods for measuring of an analyte of the present invention, in particular, may be in vivo methods. Alternatively, the method of the invention may also encompass measuring of an analyte under in vitro conditions, e.g. in a sample of a body fluid obtained from a subject, particularly from a human subject. Specifically, said method may not comprise diagnosis of disease based on said measurement.

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments.

Summarizing and without excluding further possible embodiments, the following embodiments may be envisaged:

1. A method for manufacturing a working electrode of an analyte sensor, the method comprising the steps:
   a) providing a substrate comprising
      a first side and a second side,
      at least one conductive material positioned on the first side of the substrate,
   b) applying a sensing material to an application area on the first side of the substrate, comprising
   b1) applying a first layer of a sensing material at least partially onto the conductive material,
   b2) applying a second layer of the sensing material at least partially onto the first layer of the sensing material, and
   c) obtaining the working electrode of the analyte sensor on the first side of the substrate, wherein the sensing material comprises
      at least one enzyme and
      at least one crosslinker,
   wherein the first layer of the sensing material is applied in step (b1) and the second layer of the sensing material is applied in step (b2) independently of one another in a wet layer thickness of at most about 70 μm.

2. The method of item 1 comprising at least one further step:
   b3) applying a third layer and optionally at least one further layer of the sensing material at least partially onto the second layer of the sensing material,
   wherein step (b3) is carried out after step (b2) and before step (c),
   wherein the third layer and the optional at least one further layer of sensing material is applied in step (b3) independently of one another in a wet layer thickness of at most about 70 μm.

3. The method of item 1 or 2,
   wherein the at least one conductive material positioned on the first side of the substrate is selected from gold, carbon, carbon paste and any combination thereof.

4. The method of any one of items 1-3,
   wherein the sensing material comprises the enzyme glucose oxidase (GOx).

5. The method of any one of items 1-4,
wherein the sensing material comprises at least chemical crosslinker.
6. The method of item 5,
wherein the at least one crosslinker is selected from epoxide-based crosslinkers.
7. The method of item 6,
wherein the at least one epoxide-based crosslinker is a diglycidyl ether, particularly poly(ethylene glycol) diglycidyl ether (PEG-DGE).
8. The method of any one of items 1-7,
wherein the at least one crosslinker is present in the sensing material in an amount of about 0.5% (w/w) to about 25% (w/w) based on the dry weight of the sensing material.
9. The method of any one of items 1-8,
wherein the sensing material further comprises at least one polymeric metal-containing complex.
10. The method of item 9,
wherein the at least one polymeric metal-containing complex is selected from the group of polymeric transition metal-containing complexes.
11. The method of item 10,
wherein the at least one polymeric transition metal-containing complex is selected from osmium-complexes, ruthenium-complexes, vanadium-complexes, cobalt-complex and iron-complexes.
12. The method of any one of items 1-11,
wherein at least one of the steps (b1), (b2), and, if present, (b3) is carried out via cannula-coating.
13. The method of item 12,
wherein the speed of the substrate relative to the cannula during at least one of the steps (b1), (b2), and, if present, (b3) is in the range from about 1 mm/s to about 60 mm/s, particularly in the range from about 1 mm/s to about 20 mm/s, e.g. about 8 mm/s.
14. The method of any one of items 12 or 13,
wherein the flow rate of the sensing material during at least one of the steps (b1), (b2), and, if present, (b3) is in the range from about 0.01 ml/min to about 0.09 ml/min, preferably in the range from about 0.02 ml/min to about 0.04 ml/min, particularly of about 0.03 ml/min.
15. The method of any one of items 12-14,
wherein the distance between the cannula and the surface of the first side of the substrate to which the sensing material is applied during at least one of the steps (b1), (b2), and, if present, (b3) is in the range from 30 μm to about 100 μm, particularly about 60 μm.
16. The method of any one of items 1-15,
wherein after step (b1) and before step (b2), the first layer of the sensing material is dried.
17. The method of any one of items 2-16,
wherein after step (b2) and before step (b3), the second layer of the sensing material is dried.
18. The method of any one of items 16 or 17,
wherein the drying time is about 10 min or less, particularly about 5 min or less.
19. The method of any one of items 1-18,
wherein after drying the sensing material of the working electrode has a dry total thickness in the range from about 1 μm to about 10 μm, particularly from about 1 μm to about 6 μm, and more particularly from about 2 μm to about 5 μm.

20. A method for manufacturing an analyte sensor comprising manufacturing a working electrode according to any one of items 1-19 and providing at least one further electrode
21. A working electrode of an analyte sensor obtainable by a method of any one of items 1-19.
22. An analyte sensor obtainable by a method of any one of items 1-20.
23. An analyte sensor comprising:
(i) a substrate comprising
a first side and a second side, and
at least one conductive material positioned on the first side of the substrate,
(ii) a working electrode comprising a sensing material, which at least partially covers the first side of the substrate,
wherein the sensing material is applied to an application area on the first side of the substrate, and optionally wherein the sensing material is at least partially removed from a first portion of the application area and is preserved on a second portion of the application area, and
wherein the sensing material comprises
at least one enzyme and
at least one crosslinker,
wherein the sensing material has a dry total thickness in the range from about 1 to about 10 μm, particularly from about 1 μm to about 6 μm, and more particularly from about 2 μm to about 5 μm,
and wherein the dry total thickness of the sensing material is substantially uniform over the application area including the edges of the application area or optionally over the second preserved portion of the application area including the preserved edges of the application area.
24. The analyte sensor of item 22 or 23,
wherein the dry total thickness of the sensing material at the edges shows an increase of thickness at least along one of its edges of about 0.5 μm or less, compared to the average dry total thickness of the sensing material.
25. The analyte sensor of any one of items 22-24,
wherein the dry total thickness of the sensing material at the edges shows an increase of thickness at least along one of its edges of about 0.2 μm or less, compared to the average dry total thickness of the sensing material.
26. The analyte sensor of any one of items 22-25 comprising at least one further electrode.
27. The analyte sensor of item 26,
wherein the at least one further electrode is selected from a counter electrode, a reference electrode and an combined counter/reference electrode.
28. The analyte sensor of item 26 or 27,
wherein the one further electrode is a combined counter/reference electrode.
29. Use of an analyte sensor of any one of items 22-28 for detecting at least one analyte in a sample.
30. A method for determining an analyte in a sample comprising using the analyte sensor of any one of items 22-29.

DESCRIPTION OF THE FIGURES

FIG. 1 shows an embodiment of a comparative working electrode comprising a sensing material layer prepared in a single application step. An analyte sensor 124 comprises a sensor substrate 114 having a first side 120. The first side 120 comprises at least one conductive material 111 comprising more preferably two materials, e.g. gold and/or carbon. Specifically, the conductive material may comprise a layer of gold 112 and a layer of a further material 110, for example carbon. A sensing material layer 118 applied in a single step onto the conductive material 111 positioned on the first side 120 of the sensor substrate 114 and subsequently dried is shown. The sensing material layer 118 covers at least a portion of the conductive material 111. At the edges 121a and 121b of the sensing material layer 118 a substantial increase in the total dry thickness 125a compared to the total dry thickness 125b in the central section of the sensing material layer 118 is observed.

FIG. 2 shows an embodiment of a working electrode according to the present invention. As in FIG. 1, an analyte sensor 124 comprises a sensor substrate 114 having a first side 120. The first side 120 comprises at least one conductive material 111 comprising more preferably two materials, e.g. gold and/or carbon. Specifically the conductive material may comprise a gold layer 112 and a layer of a further material 110, for example carbon.

Figure 1:
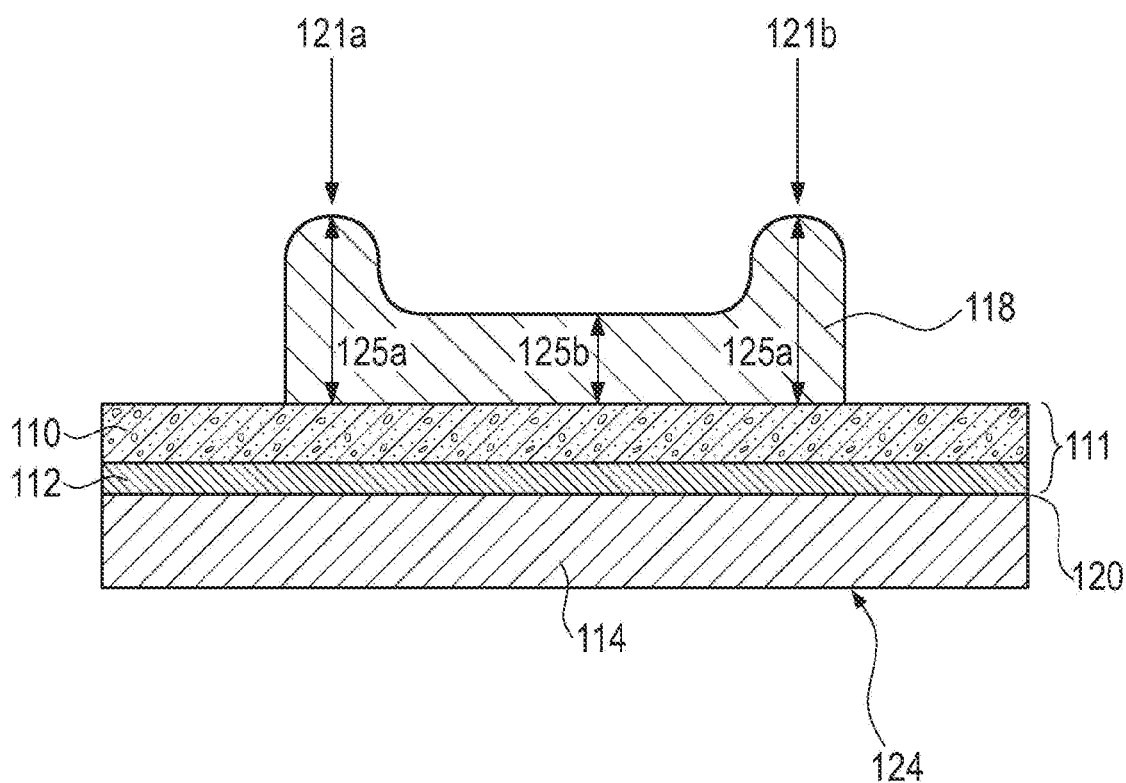
FIG. 1 shows a schematic depiction of a working electrode comprising a sensing material layer applied in a single step.
Figure 2:
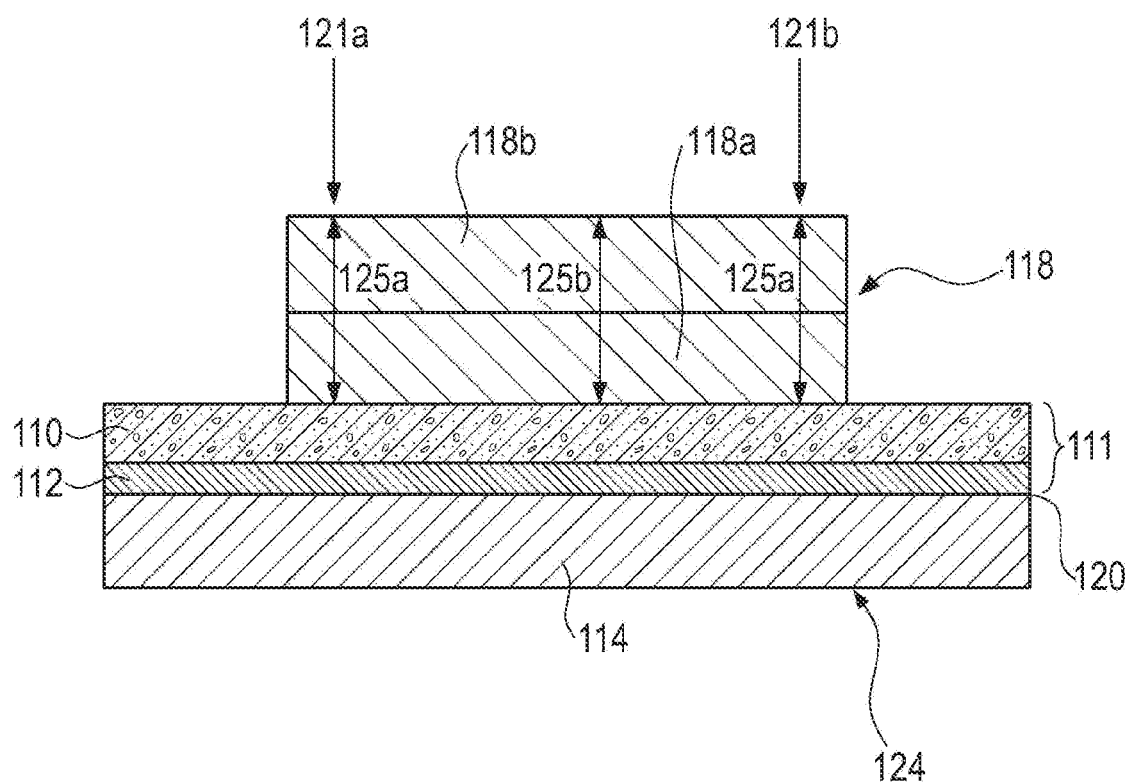
FIG. 2 shows a schematic depiction of a working electrode comprising a sensing material layer applied in two separate steps according to the present invention.

In contrast to FIG. 1, a sensing material layer 118 applied in two separate steps and dried after each application step onto the conductive material 111 positioned on the first side 120 of the sensor substrate 114 is shown. The sensing material layer 118 covers at least a portion of the conductive material 111. The dried sensing material layer 118 comprises a first dried sensing material layer 118a and a second dried sensing material layer 118b. The first and the second sensing material layers 118a and 118b usually have the same composition. They are applied in wet form by cannula-coating (not shown) each having a wet layer thickness of at most about 70 μm. After drying, a layer of dry sensing material 118 having a substantially uniform dry total thickness typically between about 1 μm and 6 μm, preferably about 2 μm and about 4 μm over the application area is obtained. At the edges 121a and 121b of the sensing material layer 118, the total dry thickness 125a is substantially the same as the total dry thickness 125b in the central section of the sensing material layer 118.

The analyte sensor 124 is an electrochemical sensor comprising at least one electrode and respective circuitry. More particularly, the analyte sensor 124 is an amperometric electrochemical sensor comprising the at least one working electrode. Typically, the analyte sensor 124 comprises at least one further electrode, particularly a counter electrode and/or a reference electrode and/or a combined counter/reference electrode. The working electrode may be sensitive for the analyte to be measured at a polarization voltage which may be applied between working and reference electrodes and which may be regulated by a potentiostat. A measurement signal may be provided as an electric current between the counter electrode and the working electrode. A separate counter electrode may be absent and a pseudo reference electrode may be present, which may also work as a counter electrode. Thus, an analyte sensor 124 typically may comprise a set of at least two or a set of three electrodes. Specifically, the sensing material 118 is present in the working electrode 122 only.

The invention is not limited to one of the embodiments described above, but is modifiable in a great variety of ways. Those skilled in the art recognize that the embodiments according to the invention can easily be adapted without departing from the scope of the invention. Thus, simple adaptations are conceivable for the preparation of the analyte sensor. The invention enables the preparation of an analyte with reproducible sensor sensitivity at reduced production costs. Further characteristics, details and advantages of the invention follow from the wording of the claims and from the following description of practical examples based on the drawings.

The content of all literature references cited in this patent application is hereby included by reference to the respective specific disclosure content and in its entirety.

EXAMPLES

The following examples serve to illustrate the invention. They must not be interpreted as limiting with regard to the scope of protection.

Example 1: Preparation of a Sensing Material Layer on a Working Electrode in a Single Step A sensor substrate based on polyethylene terephthalate and a thin layer of gold was coated with a carbon paste via doctor blading. Suitable Carbon conductive inks are available from Ercon, Inc. (Wareham, MA), E.I. du Pont de Nemours and Co. (Wilmington, DE), Emca-Remex Products (Montgomeryville, PA), or TEKRA, A Division of EIS, Inc (New Berlin, WI). Afterwards, the carbon paste was dried for 12 h at 50° C.

A layer of sensing material was applied on the sensor substrate by cannula-coating (cannula 1.6 mm (inner diameter), flow rate 0.09 ml/min, speed 8 mm/s, distance between cannula and substrate 100 μm). The sensing material was dried for 10 minutes at 37° C.

The sensing material comprised 57% by weight of a polymeric transition metal complex (modified poly (vinylpyridine) backbone loaded with poly(biimidizyl) Os complexes covalently coupled through a bidentate linkage), 33% by weight of glucose oxidase and 10% by weight of PEG-DGE (poly(ethylene glycol)-diglycidylether) in each case based on the sum of the percentages by weight of the polymeric transition metal complex, glucose oxidase and PEG-DGE. Water was used as solvent. The total concentration of the polymeric transition metal complex, glucose oxidase and PEG-DGE in water was 50 mg/ml.

Figure 3:
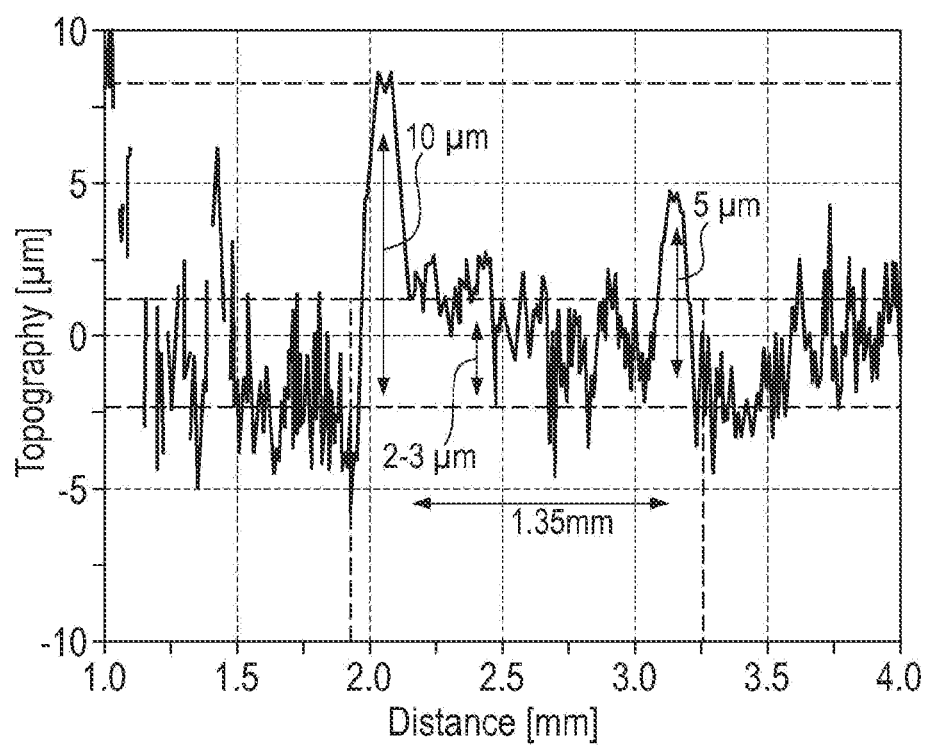
FIG. 3 shows a topographic measurement of the dry total thickness of a sensing material on a substrate after application of the sensing material in a single step.

After drying, an increased thickness at the edges of the sensing material layer was found by a topography measurement on the sensor. The thickness of the sensing material layer was 5 to 10 μm at the edges being significantly higher than in the in the center region as shown in FIG. 3.

The increased thickness at the edges may have negative effects in a laser ablation. In case a layer of about 5 μm is removed by ablation, sensing material remains at the edges and can affect the sensitivity of the sensor.

Example 2: Preparation of a Sensing Material Layer on a Working Electrode in Separate Steps According to the Present Invention A sensor substrate coated with gold and carbon paste was prepared as described in Example 1.

The sensing material of Example 1 was used.

A layer of sensing material was applied on the sensor substrate by cannula-coating in three separate steps with an intermediate drying time of about 3 min each.

The sensing material was applied on the sensor substrate by cannula-coating (cannula 1.6 mm (inner diameter), flow rate 0.03 ml/min, speed 8 mm/s, distance between cannula and substrate 30 µm). After each application, the sensing material was dried for 3 min at 22° C.

Figure 4:
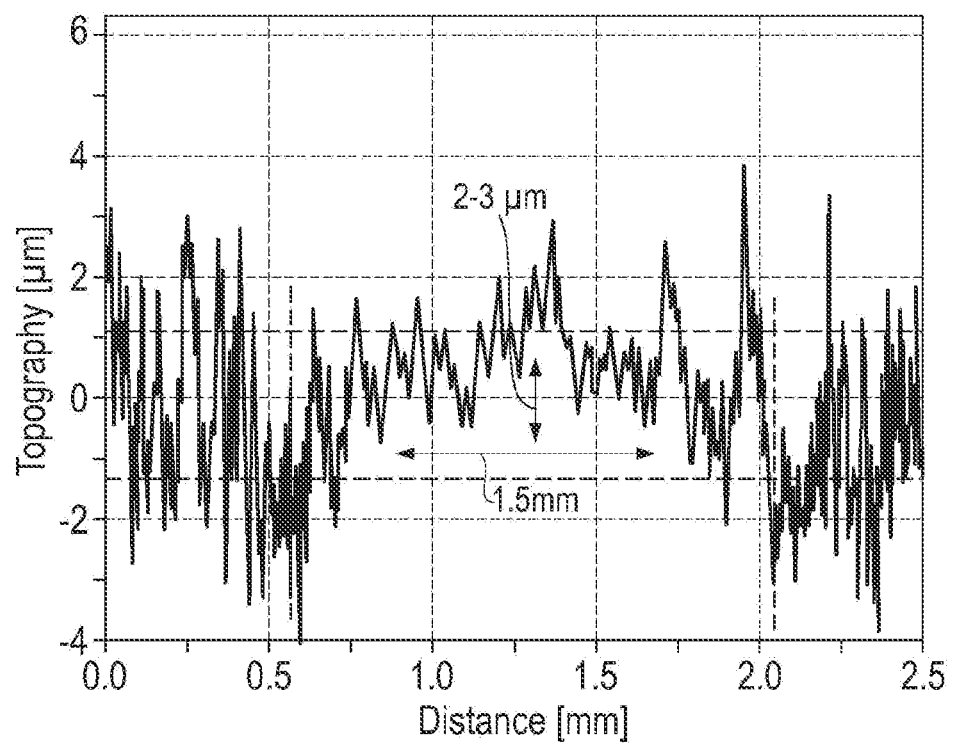
FIG. 4 shows a topographic measurement of the dry total thickness of a sensing material on a substrate after application of the sensing material in three steps according to the present invention.

FIG. 4 shows a topography measurement on a sensor after application of the sensing material in three separate steps.

No increased thickness at the edges of the sensing material was found.

Example 3: Variation of Coating Conditions in the Preparation of a Sensing Material Layer on a Working Electrode in Separate Steps According to the Present Invention The uniformity of the coating layer may be improved by the type and amount of crosslinker, the amount of enzyme and the transition metal complex-containing polymer. Particularly, the presence of a crosslinker is advantageous.

In the experiments of Tables 2 and 3, the sensing material according to Example 1 was used, whereas in the experiments of Table 1, the crosslinker was omitted from the sensing material.

Table 1 shows the results of coating experiments without crosslinker.

| Crosslinker | Flow rate ml/min | Distance [µm] | Speed [mm/s] | Dimensions width [mm] | Wet layer thickness theoretically [µm] | Height theoretically [µm] | Height measured [µm] | Edge [µm] |
|---|---|---|---|---|---|---|---|---|
| — | 0.02 | 30-60 | 8 | 1 | 42 | 1.5 | 1 | 2 |
| — | 0.03 | 30-60 | 8 | 1 | 63 | 2.2 | 1 | 2 |
| — | 0.04 | 30-60 | 8 | 1.3 | 64 | 2.2 | 2 | 3 |
| — | 0.05 | 30-60 | 8 | 1.4 | 74 | 2.6 | 2 | 3 |
| — | 0.06 | 30-60 | 8 | 1.5 | 96 | 3.4 | 3 | 4 |

As can be gathered from Table 1, an increased thickness at the edges was observed. Further, a coating over the complete breadth of the cannula was not obtained.

Table 2 shows the results of coating experiments in the presence of crosslinker PEG-DGE

| Crosslinker | Flow rate ml/min | Distance [µm] | Speed [mm/s] | Dimensions width [mm] | Wet layer thickness theoretically [µm] | Height theoretically [µm] | Height measured [µm] | Edge [µm] |
|---|---|---|---|---|---|---|---|---|
| PEGDGE 200 | 0.02 | 30-60 | 8 | 1 | 42 | 1.5 | n.a. | n.a. |
| PEGDGE 200 | 0.03 | 30-60 | 8 | 1.3 | 48 | 1.7 | 1 | — |
| PEGDGE 200 | 0.04 | 30-60 | 8 | 1.3 | 64 | 2.2 | 1.5 | 2 |
| PEGDGE 200 | 0.05 | 30-60 | 8 | 1.3 | 80 | 2.8 | 1.5 | 3 |
| PEGDGE 200 | 0.06 | 30-60 | 8 | 1.3 | 96 | 3.4 | 2 | 3.5 |

When using the crosslinker PEG-DGE 200, an improved spreading of the sensing material was observed, however, not across the complete breadth of the cannula (inner diameter 1.54 mm, outer diameter 1.83 mm). An increased thickness at the edges was only observed when the wet layer thickness was higher than about 40 µm.

Table 3 shows the results of coating experiments in the presence of crosslinker PEG-DGE 500 10% (w/w) dry.

| Crosslinker | Flow rate ml/min | Distance [µm] | Speed [mm/s] | Dimensions width [mm] | Wet layer thickness theoretically [µm] | Height theoretically [µm] | Height measured [µm] | Edge [µm] |
|---|---|---|---|---|---|---|---|---|
| PEGDGE 500 | 0.01 | 30-60 | 8 | 0.5 | 42 | 1.5 | — | — |
| PEGDGE 500 | 0.02 | 30-60 | 8 | 1.3 | 32 | 1.1 | — | — |
| PEGDGE 500 | 0.03 | 30-60 | 8 | 1.8 | 35 | 1.2 | 1 | — |
| PEGDGE 500 | 0.04 | 30-60 | 8 | 1.8 | 46 | 1.6 | 1.5 | — |
| PEGDGE 500 | 0.05 | 30-60 | 8 | 1.7 | 61 | 2.1 | 1.5 | 2 |
| PEGDGE 500 | 0.06 | 30-60 | 8 | 1.7 | 74 | 2.6 | 1.5 | 2.5 |
| PEGDGE 500 | 0.09 | 100-130 | 8 | 1.6 | 117 | 4.1 | 3 | 6 |

When using the crosslinker PEG-DGE 500, the sensing material was spreading over the complete cannula breadth with a flow rate of at least 0.03 ml/min. An increased thickness at the edges was observed only at a wet layer thickness of more than about 60 μm.

The invention claimed is:

1. A method for manufacturing a working electrode of an analyte sensor, the method comprising the steps:
   a) providing a substrate comprising
   a first side and a second side, and
   at least one conductive material positioned on the first side of the substrate,
   b) applying a sensing material to an application area on the first side of the substrate, the sensing material comprising at least one enzyme and at least one cross-linker,
   b1) applying a first layer of a sensing material at least partially onto the conductive material, and
   b2) applying a second layer of the sensing material at least partially onto the first layer of the sensing material,
   wherein the first layer of the sensing material is applied in step (b1) and the second layer of the sensing material is applied in step (b2) independently of one another in a wet layer thickness of at most about 70 μm, and
   wherein the sensing material further comprises at least one metal-containing complex.

2. The method of claim 1 comprising a further step:
   b3) applying a third layer of the sensing material at least partially onto the second layer of the sensing material, wherein step (b3) is carried out after step (b2) and before step (c),
   wherein at least one third layer is applied in step (b3) independently of one another in a wet layer thickness of at most about 70 μm.

3. The method of claim 1, wherein the at least one conductive material positioned on the first side of the substrate is selected from gold, carbon, carbon paste and any combination thereof.

4. The method of claim 1, wherein the enzyme is a glucose oxidase (GOx).

5. The method of claim 1, wherein the at least one crosslinker is a diglycidyl ether.

6. A method for manufacturing a working electrode of an analyte sensor, the method comprising the steps:
   a) providing a substrate comprising a first side and a second side, and at least one conductive material positioned on the first side of the substrate,
   b) applying a sensing material to an application area on the first side of the substrate, the sensing material comprising at least one enzyme and at least one cross-linker,
   b1) applying a first layer of a sensing material at least partially onto the conductive material, and
   b2) applying a second layer of the sensing material at least partially onto the first layer of the sensing material,
   wherein the first layer of the sensing material is applied in step (b1) and the second layer of the sensing material is applied in step (b2) independently of one another in a wet layer thickness of at most about 70 μm, and
   wherein at least one of the steps (b1) and (b2) is carried out via cannula-coating.

7. The method of claim 6, wherein the speed of the substrate relative to the cannula during at least one of the steps (b1) and (b2) is in the range from about 1 mm/s to about 20 mm/s.

8. The method of claim 6, wherein the flow rate of the sensing material during at least one of the steps (b1) and (b2) is in the range from 0.02 ml/min to about 0.04 ml/min.

9. The method of claim 6, wherein the distance between the cannula and the surface of the first side of the substrate to which the sensing material is applied during at least one of the steps (b1) and (b2) is in the range from about 30 to about 50 μm.

10. The method of claim 9, wherein after at least one of the steps ((b1) and (b2) the sensing material is dried and wherein the sensing material has a total dry thickness in the range from about 1 μm to about 10 μm.

11. An analyte sensor comprising:
    a substrate comprising
    a first side and a second side, and
    at least one conductive material positioned on the first side of the substrate, and
    a working electrode comprising a sensing material, which at least partially covers the at least one conductive material, and
    wherein the sensing material comprises
    at least one enzyme and
    at least one crosslinker, and
    the sensing material comprises a metal-containing complex and/or at least one of the steps (b1) and (b2) is carried out via cannula-coating,
    wherein the sensing material has a dry total thickness in the range from about 1 μm to about 10 μm, and wherein the dry total thickness of the sensing material is substantially uniform over the application area including the edges of the application area or.

12. The analyte sensor of claim 11 comprising at least one further electrode.

13. A method of detecting an analyte in a sample comprising using the analyte sensor of claim 11.

14. The analyte sensor of claim 11 wherein the sensing material further comprises at least one metal-containing complex.

15. The analyte sensor of claim 11 wherein at least one of the steps (b1) and (b2) is carried out via cannula-coating.

16. The analyte sensor of claim 15 wherein the sensing material further comprises at least one metal-containing complex.

17. The analyte sensor of claim 11 wherein (b3) is about 8 mm/s.

18. The analyte sensor of claim 11 wherein at least one of the steps (b1) and (b2) is in the range from about 30 to about 50 μm.

19. The analyte sensor of claim 11 wherein the total dry thickness is in the range from about 1 μm to about 6 μm.

20. The analyte sensor of claim 19 wherein the total dry thickness is in the range from about 2 μm to about 5 μm.

21. The analyte sensor of claim 11 in which the further electrode is a combined counter/reference electrode.

22. The analyte sensor of claim 11 wherein the sensing material is applied to an application area on the first side of the substrate, in a manner so that the sensing material is applied at least partially onto the conductive material.

23. The analyte sensor of claim 11 wherein the sensing material is at least partially removed from a first portion of the application area and is preserved on a second portion of the application area.

* * * * *